July 3, 1962   F. K. HURD   3,042,298
ARTICLE AND MACHINE FOR VERIFYING CHECKS AND THE LIKE
Filed Oct. 31, 1958   3 Sheets-Sheet 1

INVENTOR.
FRANK KENNETH HURD
BY
ATTORNEY

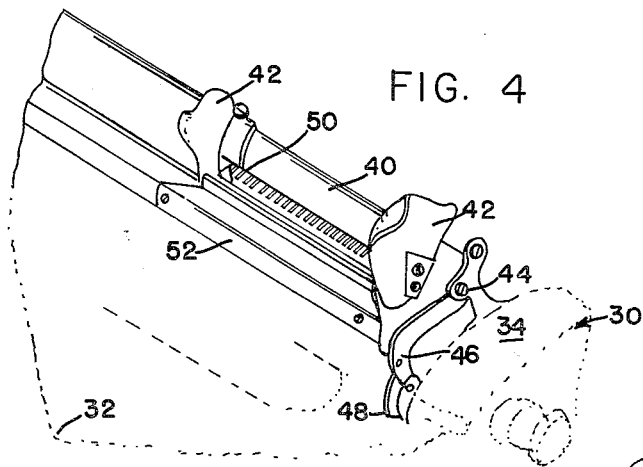
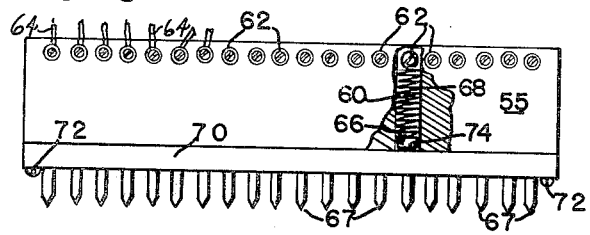
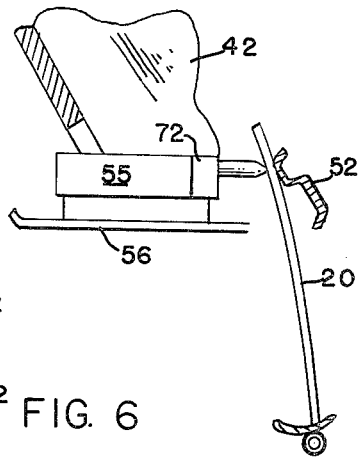
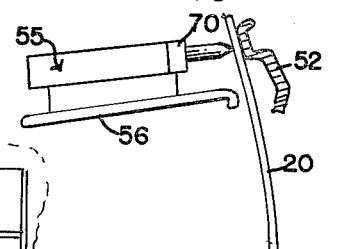
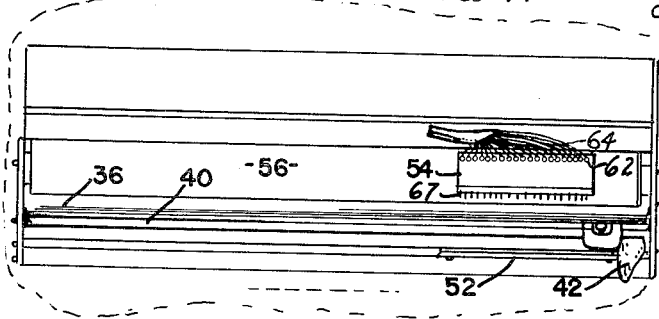

July 3, 1962

F. K. HURD 3,042,298

ARTICLE AND MACHINE FOR VERIFYING CHECKS AND THE LIKE

Filed Oct. 31, 1958

INVENTOR.
FRANK KENNETH HURD
BY Patrick D. Henry
ATTORNEY

United States Patent Office 3,042,298
Patented July 3, 1962

3,042,298
ARTICLE AND MACHINE FOR VERIFYING CHECKS AND THE LIKE
Frank Kenneth Hurd, Atlanta, Ga., assignor to Jack F. Glenn, Hugh W. Fraser, Jr., and A. M. Adamson, trustees for the Employees' Saving and Profit Sharing Trust Fund of the Citizens and Southern National Bank
Filed Oct. 31, 1958, Ser. No. 771,038
21 Claims. (Cl. 235—61.7)

This invention relates to a method, article and machine for verifying bank checks and the like and particularly to a method of comparing indicia on a bank check, sales slip, deposit slip or other similar article against a basic index system to determine if the article and index match in order to reduce the errors of wrong matching incurred in other known methods. The machine presented herein is a comparator sensing attachment for any bookkeeping or identification machine and which will prevent the main machine from operating unless there is a proper comparison.

More particularly, the present method is especially useful in posting checks against checking accounts at banks where the usual procedure is to visually inspect the check, remove the account statement record card from the file, insert the card in a posting machine and post the amount of the check against the statement carrying the balance at the end. Or, as is of recent innovation in some banks, posting to the check face by locating the balance from accumulated checks in a posting file to pick up the balance and then posting directly to the new checks in the file with the balance carried thereon. Obviously, if the operator selects the wrong account from the file (which can easily happen in a system of 100,000 accounts where there are numerous John H. Smiths or James J. Joneses) then a check not properly chargeable against an account will erroneously be entered on it. According to the method in this application, the check itself is provided with some fixed indicia to identify the account, such as punched holes, magnetic ink or other coded indicia. Then when the statement is pulled or check pack is located in the file, the operator codes in the correct identifying symbol of that account which must match with the check being charged or else the posting apparatus will not function.

In the particular embodiment of the check, method and machine presented herein, which in no way is to be construed as the only way the present invention can be practiced, the check, and every check in fact that is issued to one customer on his particular account, would have a perforated or other index or coded indicia thereon. It has been found satisfactory in handling many thousands of accounts that only one number of between 1 to 99 account identification numbers need be used and this can be indexed by using two groups of 10 digits each and only 10 positions on the check. That is, it has been found that the most frequent errors occur from perfectly normal mistakes of confusing similar last and first names right in the same general location and that usually the operator is in the right place in the file but has merely pulled the wrong name which is similar to the name intended, sometimes the very next name. Therefore, if the comparator will handle coded numbers 0 through 99, the usual mistake is prevented, since the device will prevent mistaking code 11 for code 12 where, for example, there are two John H. Smiths and one is assigned code 11 and the other code 12.

The embodiment of the machine presented herein for accomplishing the present method is adapted for use with a conventional posting machine which has a movable upper carriage thereon and has a shifting paper bar on the carriage. The electric power supply of the main posting machine is controlled by the present invention to the extent that the machine will "lock up," that is, it will be denied power for operation unless the code on the check matches with the code of the account. In operation, the operator inserts a check in the paper bar of the machine and punches on a manual keyboard of the present invention the correct coded index chosen by sight from the main account file. For example, the operator is posting a stack of checks that came in for posting and she reaches the name John H. Jones. She then thumbs through the file box to John H. Jones and sights on his card the code number 11. Inserting the check in the machine, she punches 11 on the keyboard and proceeds to punch the posting key of the main machine. If she has selected a different John H. Jones check on an account with code 12, the machine refuses to operate until she corrects the mistake.

Each check is provided with a punched code of two digits and there are spaces in alignment on the face of the check for any two of twenty digits. The usual paper shifting bar of the posting machine has been replaced by a modified one having a space cut therefrom to expose the face of the check to the back and front when the check is properly aligned in the alignment feed bracket. The posting machine frame behind the shifting bar is provided with the novel sensing device of the present invention which is presented in the form of a plastic or Bakelite rectangular body having twenty transverse holes therein in each of which is positioned for movement an electrical sensing plunger; and the front of the machine is provided with a conducting contact plate against which the plungers operate. If the plungers pass through the proper openings in the check then they will make contact thereby indicating mechanically and electrically that the check matches with the coded index. If, on the other hand, either plunger fails to make contact, the current to the main posting machine is denied.

Electrically a novel circuit arrangement is used employing switches in circuit with each plunger and a relay for each group of ten switches. Control current through both relays closes the main line circuit to permit full current to the posting machine.

A primary object of this invention is to provide a check article having index material thereon which is coded and may be used with a code comparator to verify the check.

Another objective of this invention is to provide a method of comparing a check against the office account to determine during fast handling if the check is properly credited whereby the chances of charging the wrong account are reduced.

A further object is to provide an electrical sensing element which can be used on a posting machine to sense coded indicia in a check or the like to compare same against the identification code on the main office account.

Another object is to provide an electrical apparatus for sensing a coded index and to determine if the power supply will be terminated according to the comparison made with said index.

An additional object resides in the modification of the posting machine paper shifting bar to incorporate the sensing device.

Other and further objects and advantages of my invention will be apparent from the following description taken in conjunction with the accompanying drawings, wherein:

FIG. 3 is a perspective view of the machine in FIG. 1 with a check in position behind the shifting bar before the carriage is shifted.

Figure 1:
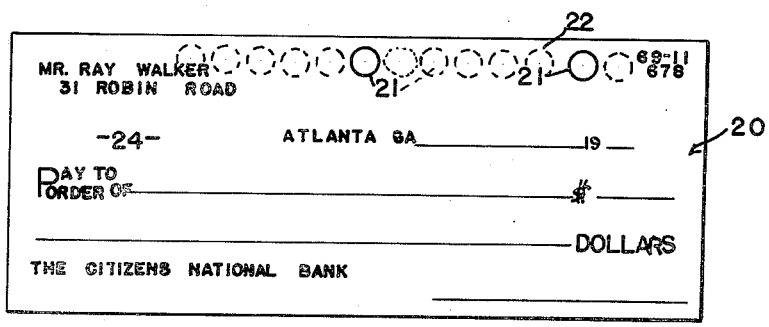
FIG. 1 is a flat plan view of the face of a bank check showing the perforations used in the sensing method.
Figure 2:
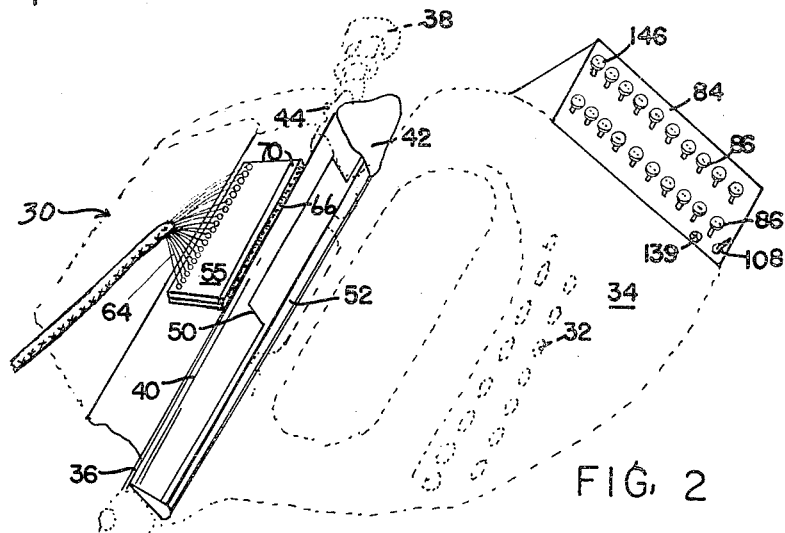
FIG. 2 is a perspective view of part of a posting machine with the paper shifting bar in full lines and showing the sensing device.
Figure 3:
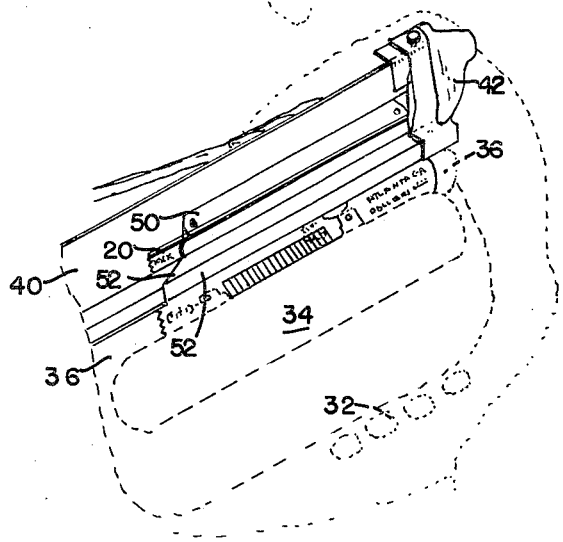

FIG. 4 is a perspective view of the machine in FIG. 1 similar to the view in FIG. 3 but with the check removed.

FIG. 5 is a top plan view of the sensing device of this invention with the plungers extended and having a portion broken away to expose an electrical sensing plunger.

FIG. 6 is a front side elevation view of the sensing device in FIG. 5.

FIG. 7 is a top plan view of a sensing plunger bracketed with its contact spring.

FIG. 8 is a front end view of the plunger in FIG. 7.

FIG. 9 is a side elevation cross-sectional diagrammatic view of the sensing element, shifting bar and check immediately after shifting.

FIG. 10 is a view similar to that of FIG. 9 but with the sensing elements shifted completely to sensing position.

FIG. 11 is a top plan view of the machine in FIG. 1.

Figure 12:
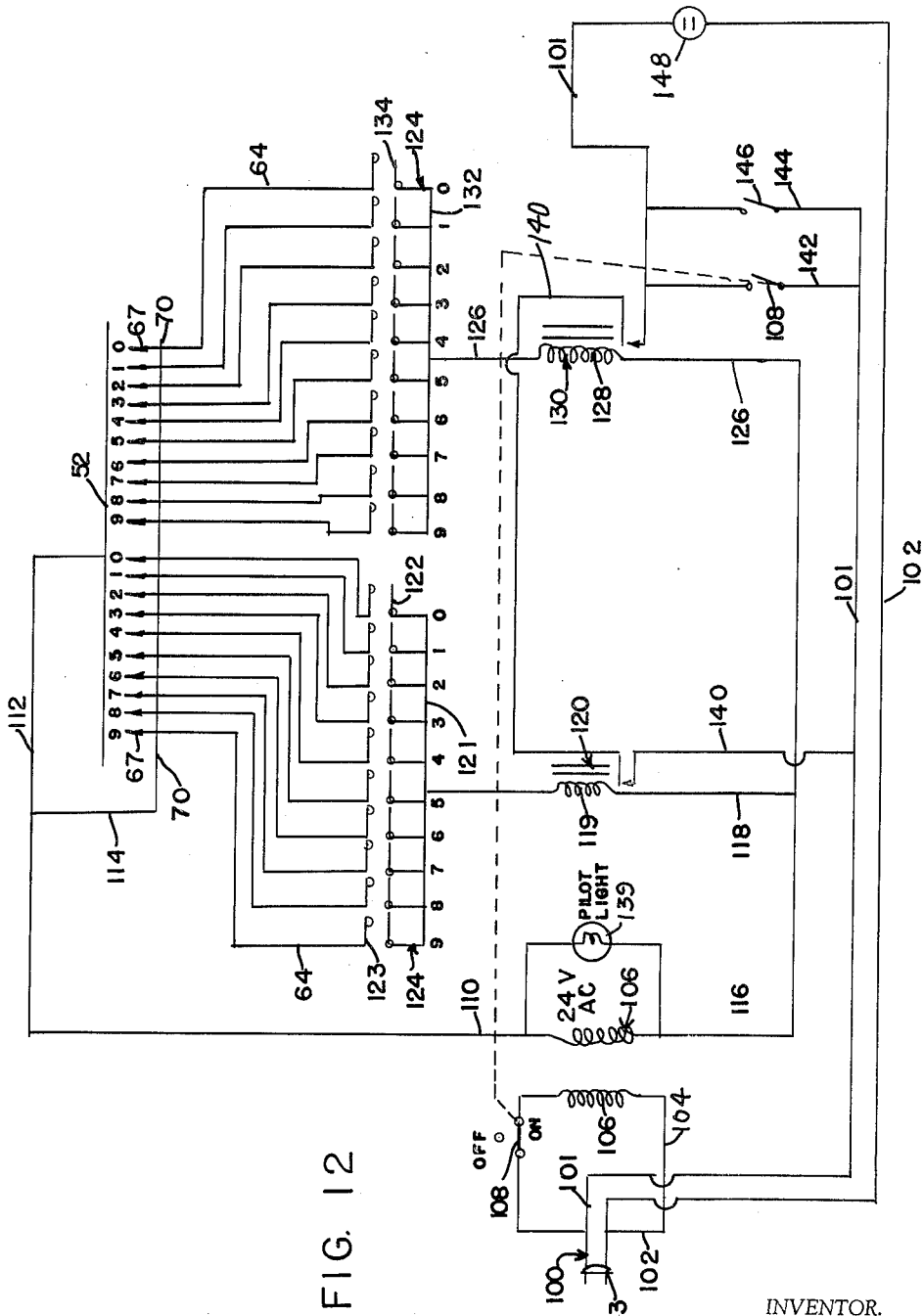

FIG. 12 is an electrical diagram of the sensing element and the control circuitry to the main machine.

As explained heretofore in the introduction, the check of this invention designated by number 20 has been modified for use with this method by providing perforated holes 21 at the top portion 22 of the face 24 thereof. According to this plan, there is space across the face of the check for twenty such holes in a straight line, although for normal use only two such holes would actually be punched. Each of the available spaces therefore represents a basic index position across the front of the check and later across the front of the machine.

A conventional posting machine 30 employs the usual electrical keyboard system 32 with main outside cover 34, carriage platen 36 and platen knobs 38. The details of the posting machine, especially the internal details, do not form any particular part of this invention since the present invention will work with any posting machine by terminating the power thereto. The paper shift and alignment bar is modified and represents a new innovation in the posting art. The shifting bar apparatus 39 employs a long, flat, plate-like alignment bar 40 having a paper guide bracket 42 thereon and being shiftable on the upper part of the machine 30 toward and away from the platen 36 by means of the usual shifting levers 44, connected by a lever 46 with the internal shift lever 48 in response to the key action of the main keyboard 32. According to the present shifting bar 40, a front portion 50 has been removed in an open rectangular area open from front to back of the machine. A pair of the paper alignment brackets 42 is arranged on the bar 40 in opposed relationship about the opening 50 so that a check 20 dropped therein against the alignment brackets 42 will feed in alignment between the brackets 42 and in front of and exposed to the opening 50. Stationary on the front of the machine frame and outer shell 34 and immediately in front of and exposed both to the check 20 and the opening 50 therebehind is a conductive electrical contact bar 52 against which contact will be made as explained hereinafter.

The sensing device 54 of this invention is mounted on a flat plate 56 forming part of the permanent back frame of the machine 30 shifting bar apparatus 39 and it rocks slightly as the shifting bar 40 moves from full open to full closed. Sensing device 54 consists of a flat, thick bar or case 55 of plastic, "Bakelite" or other insulated material having a series of parallel bores 60 therein each leading to a respective electrical contact screw 62 receiving an individual circuit wire 64. Each bore has mounted thereon a contact sensing element 66 in the form of a plunger 67 of conductive materials such as brass or copper, extended in the bore by a spring 68 confined therein and operating through a contact bar 70 held by screws 72 on the front of case 55. Each plunger has a head 74 preventing its removal, except by removing bar 70, and limiting the outward displacement of the plunger 67. Around the elongated body 76 of plungers 67 is an insulating sheath or cover 78 of tubular plastic or other insulating material and between each head 74 and the bar 70 is a small turn of conductive spring wire 80.

Referring to the diagrams in FIGS. 9 and 10, it is seen that when the check 20 is in position on the bar 40 the sensing element 54 is therebehind with the plungers 67 protruding against the back of the check 20 and pushing the check against the copper contact bar 52. In FIG. 9 the machine bar 40 has just closed to bring the plungers 67 against the back of check 20 but not yet in best alignment and as the machine tightens to the position of FIG. 10 the plungers 67 extend directly against the check and against the copper contact bar 52. Therefore, if the check openings 21 correspond with any of the plungers, which they should, then the plunger 67 will pass through the opening 21 and contact the front bar 52. Obviously, this is used to determine the connection electrically within the sensing mechanism.

The side of the case 34 of machine 30 has the main indexing and keyboard attachment 84 of this invention which attachment employs keys 86 in two rows of ten keys each, all in a common electrical box 88. Keys 86 all operate an individual switch (not shown) in a gang switch arrangement inside box 88 to close circuits as described hereinafter. The circuits from and involving the switches of keys 86 are connected with and to the sensing device 54 by means of the wires 64 attached to the screws 62. Accordingly, entries on the keyboard 86 will affect the operation of the sensing device 54, to wit: if two particular digits such as, for example, "11" on the two sets of keys 86 are selected and entered from the statement card then the sensing plungers 67 connect with a respective key switch 86 and the holes 21 in each check represent corresponding digits so that unless the number "11" on keys 86 and the plungers 67 match with the holes in check 20, electrical contact is not effected and power is denied the main machine 30.

As is readily seen in FIGS. 9 and 10, when the check 20 is in position, sensing plungers 67 contact the check and will go completely through the holes 21 that are in the check but will be prevented therefrom where there are no holes.

*Circuit Operation*

Referring to the circuit diagram of FIG. 12, it is seen that the incoming main line 100 with sides 101, 102 for operating the basic machine 30 is provided with an electric plug 103. From opposite sides of line 100 is a line 104 having one coil of a transformer 106 therein and being provided with an "on-off" double pole, double throw switch 108 which energizes line 100 when the comparator sensing device 54 is not being used and at that time line 100 is controlled by the control circuit through transformer 106. The other side of transformer 106 has one side thereof 110 leading through a line 112 to the contact bar 52 on the front of the machine 30 and also a branch 114 leading to the bar 70 on the sensing device case 55. The other side 116 from transformer 106 leads through one line 118 through the coil 119 of relay 120 to the terminal strip 121 having all of the switch contacts 122 of the individual switches 123 of gang switch 124 from one row of ten of the keys 86 and also leads through another line 126 through the coil 128 of a relay 130 to the terminal strip 132 having all of the switch contacts 134 of the other row of ten of the gang switches 124. The other sides of the switches 123 each is connected through the line 64 to a respective plunger 67 in the sensing device 54. A pilot light 139 is provided in a line across the transformer lines 110, 116.

A line 140 from side 101 is connected through the switch side of the relay 120 and through the switch side of relay 130 back to side 101. Side 101 has a line 142 with switch 108 therein and also a line 144 with a reset switch 146 therein which is spring pressed to remain open when released. Sides 101, 102 of line 100 terminate at a common connection plug 148 into which the power supply of the basic machine 30 is connected. According to this arrangement, unless there is basic line power from plug 103 through line 100 to plug 148, the basic machine 30 cannot function; and power through line 100 is controlled by the operation of the sensing device 54 by the control circuit through transformer 106 in line 101. Following the circuit of line 100 it is seen that with switches 108 in line 101 and re-set switch 146 normally open, both relay contacts in relays 120, 130 must be closed before a circuit will be complete from line 101 through line 140 because both lines 142 and 144 are open. In order for these relays 120, 130 to be closed they must be energized from their respective circuits 113, 126 which requires that circuit from transformer 106 be complete through line 110, through either line 114 or 112 and through at least one contact switch 123 in group 124 which means that the plunger 67 corresponding with the particular switch number 123 must be closed either through bar 52 or through bar 70 depending upon which circuit 114, 112 is closed; and at the same time the circuit through either 112, 114 must be complete through at least one switch contact of the 134 switches corresponding with the same plunger 67 making contact either through bar 52 or bar 70. This happens in two instances: initially power is on the main machine 30 through all the switches 123, 134 since they are normally in contact through their respective wire 80 with bar 70 so that the machine always has initial power to shift the carriage and actuate the shifting levers 44, 46 to actuate the shifting bar 40 into the position of FIG. 9. However, as soon as the bar 40 is shifted into check engaging position of FIG. 9 the plungers leave contact with bar 70 and power will be lost unless the proper comparison is made through the plungers 57 through the front bar 52. In other words, unless the holes in check 20 match with the index number punched into keys there will not be a complete circuit from plug 103 through line 100 to 148 as it will be incomplete either at one or both of the relays 120, 130.

*Procedure*

As pointed out initially in the introductory text material, when the present system and method is used in banks to verify checks, each account, that is, each separate checking account name would carry a different index number. Since there are twenty locations 21 across the face of check 20, there will be two holes of that twenty punched to align with the corresponding plunger number 67 and there will be one digit from each group of ten.

The check is picked up manually and inserted in front of the bar 40 alongside the marginal guides 42 and in front of the opening 50 but behind the front contact bar 52. The operator observes visually from the file what she believes the account is according to the name she observes on the check (and usually the name is printed on the check as shown in FIG. 1). Assuming that she sees John J. Jones on the check and selects a John J. Jones index number "4 3" by reading it from the master file, she inserts the check in the posting machine 30 and manually punches number "4 3" on the keyboard 84 keys 86. Referring to FIG. 12, it is seen that with re-set switch "146" open and manual "off-on" switch in the verifying position shown with line 142 open, then there is line current at plug 148 through all of the contacts 67 against bar 70 but the machine cannot post until the carriage 40 is shifted through the operation of the proper key on board 32. However, as soon as the carriage shift key on board 32 is actuated, all contacts 67 leave bar 70 and current is broken through this route. Now switches "4 3" in respective groups 123, 134 are closed and if plungers "4 3" in group 67 match with the holes in the check 20 then the plungers "4 3" will pass through the check and complete the contact at front bar 52. Assuming that the check is correct in this example, then relays 120, 130 are energized and current flows through line 100 to plug 148 and the machine will post in the position shown in FIG. 10.

If, however, the operator selected the wrong John J. Jones account from the file and the check, let us assume, actually belongs to the next John J. Jones in the file, then the operator has entered a number "4 3" in keyboard 86 but the holes punched in the check 20 are punched for the arrangement "4 4" and while plunger number 67–4 will pass through the check, plunger number 67–3 will not pass through the check to make contact with front bar 52. Therefore, while one relay 120 is energized, the other relay 130 is not and the flow of line current is incomplete at relay 130. In this case, the operator fails to get posting operation and she inspects the situation to determine what error has been made.

As pointed out previously, for several thousands of accounts the use of only two groups of ten keys is sufficient to reduce the errors to an acceptable margin. However, the number of groups may be increased as desired simply by adding more keys 86 and corresponding switches, plungers and circuits. On the other hand, the number of keys can be reduced, for example, by using some other combination such as only 8 keys and then adding more control relays 120 at the same time increasing the number of holes 21 in the check so that more plungers 67 are used as, for instance, four at one time instead of two. Therefore, the number of keys 86 and switches 124, the number of control relays 120, and the number of plungers 67 may be changed and increased or decreased in whatever combination is preferred for the particular application.

Most of the electrical apparatus in the sensing circuit is contained within the box 84. The relays 120, 130, all the gang switches 124, the switches 108, 146 and the pilot light 139 are all attached with the box 84 and the circuits involving these elements are connected by means of wires, including the wires 64, all grouped into a covered line leading to the sensing device 55. Plug 103 is preferably on an extension cord for plugging into a conventional 110 volt A.C. office socket while plug 148 is mounted on the box 84 and receives the power line of the machine 30 therein.

While I have shown and described a particular embodiment of my invention in connection with bank checking accounts in particular, this is by way of illustration only and the same system may be used for many other comparisons besides checks and for many other things both in the present form and in various other forms since alterations, substitutions, eliminations, changes, variations, and modifications may be made in the embodiment shown and described without departing from the scope of my invention defined in the appended claims.

I caim:

1. In a slip positioning and retaining member for use on a bookkeeping machine having printing surface and a sensing arrangement for comparing information, a slip positioning bar movably mounted on said machine adjacent said printing surface to hold a slip inserted therein for printing by said machine, a slip guide on said bar against which said slip may be positioned to guide same in proper alignment into said machine and said bar, said bar having an open sensing space therein through which sensing elements may extend, and a sensing device on said machine behind said sensing space, said bar being movable from a sensing to non-sensing position to bring said slip into sensing position with said sensing device to sense data on said slip.

2. In a slip positioning and retaining member for use on a bookkeeping machine having printing surface and a sensing arrangement for comparing information, a slip positioning bar movably mounted on said machine adjacent said printing surface to hold a slip inserted therein for printing by said machine, a slip guide on said bar against which said slip may be positioned to guide same in proper alignment into said machine and said bar, and a sensing device on said machine for sensing information on the slip, said bar being movable from a sensing to non-sensing position to bring said slip into sensing position with said sensing device to sense data on said slip.

3. In a slip positioning and retaining member for use on a bookkeeping machine having a printing surface and a sensing arrangement for comparing information, an elongated slip positioning bar movably mounted on said machine adjacent said printing surface to hold in alignment a slip inserted therein for printing by said machine, said bar having an elongated opening therein corresponding with a sensing data space on the surface of the slip, a sensing device on said machine behind said opening and having a plurality of sensing elements contactible with said slip through said opening to sense certain information on the surface of said slip, said bar being movable on said machine from a slip inserting non-sensing position to a sensing position to bring said sensing elements into sensing position with said slip.

4. In a slip positioning and retaining member for use on a bookkeeping machine having a printing surface and a sensing arrangement for comparing information entered as holes in said check, an elongated slip positioning bar movably mounted on said machine adjacent said printing surface to hold a slip inserted therein for printing by said machine, said bar having an elongated opening therein corresponding with a sensing data space on the surface of the slip, a side edge alignment bracket on said bar having a flat surface against which said slip edge is held to position said slip in alignment for sensing on said machine, a sensing device on said machine behind said opening and having a plurality of electrical sensing elements contactible with said slip through said opening to sense certain information on the surface of said slip, said bar being movable on said machine from a slip inserting non-sensing position to a sensing position to bring said sensing elements into sensing position with said slip and in alignment with the data holes in said slip, and an electrical contact bar on the front of said machine against which said sensing elements make contact at places where there are holes in said slip.

5. In a sensing device for verifying bank checks and the like on a conventional office machine that normally performs bookkeeping or other operations on the check and wherein said check is provided with a coded indicia representing identifying information, an electrical current power line for said machine, a check positioning means on said machine in which said check can be positioned for alignment thereon, a sensing means on said machine located adjacent said check position for sensing said check when positioned therein, said main power circuit normally being open at said sensing means whereby power is denied to said machine, coded indicia on said check causing electrical response in said sensing means, and an indexing means on said machine electrically connected with said sensing means to index a code therein, said code in said sensing device being electrically operable with said check to cause an electrical circuit thereat when said code index corresponds with said check code, said sensing means sensing said check and remaining electrically open when said code therein fails to match with the check, whereby checks inserted into said machine are verified against the account index entered into said indexing means and said machine will not operate unless said identification is correct.

6. In a sensing device for vertifying bank checks and the like on a conventional office machine that normally performs bookkeeping or other operations on the check and wherein said check is provided with a coded indicia representing identifying information, an electric power current line for said machine, a check positioning means on said machine in which said check can be positioned for alignment thereon, a sensing means on said machine located adjacent said check position for sensing said check when positioned therein, a plurality of electrically conductive elements in said sensing means, said main power circuit normally being open at said sensing means whereby power is denied to said machine, electrically coded indicia coded by electrically conductive means on said check causing electric response in said sensing means, and an indexing means on said machine electrically connected with respective elements on said sensing means to index a code therein, said code in said sensing device being electrically operable with said check to cause an electrical circuit thereat when said code index corresponds with said check code, said sensing means sensing said check and remaining electrically open when said code therein fails to match with the check, whereby checks inserted into said machine are verified against the account index entered into said indexing means.

7. In an electrical sensing apparatus for bookkeeping machines in which a record slip such as a bank check is inserted to have information printed thereon and wherein said slip is brought into position in alignment in said machine, and wherein said slip has been pre-indicated with certain identifying information to be verified and sensed on said machine, an electrical sensing head having a plurality of sensing plungers projecting therefrom, a plunger bore formed in said head for each of said plungers and having spring means thereon for resisting movement of said plungers and to return same to normal extensive position, a common electrical contact bar on said head normally contacted by all of said plungers in normal non-sensing position, a main line current for said main bookkeeping machine controlled by said sensing device and having a control line, one side of said control line electrically including said contact bar, a sensing bar mounted on said bookkeeping machine and being connected with said line having said contact bar, the other side of said control line having a sensing relay therein, a plurality of sensing index switches in said sensing control circuit, each of said switches being manually operated to index sensing data therewith, each of said index switches being connected with a respective sensing element whereby said sensing element corresponds with a particular manual index switch, said sensing relay normally being open thereby opening the controlled main line circuit.

8. In an electrical sensing device for attachment on a conventional bookkeeping machine which normally is power operated by a line current and which device controls the power line to the machine to prevent operation thereof unless a correct comparison is accomplished by the sensing device on a slip having pre-coded information thereon, a retaining means on said machine into which said slip may be inserted in alignment and removed therefrom, a sensing head adjacent and cooperating with said retaining means to sense information on the slip inserted therein, said sensing head having electrical sensing contact plungers mounted therein for contacting the surface of the slip positioned, a control circuit for said power line, a control relay in said control circuit normally maintaining said line open whereby power will not be available to said bookkeeping machine unless said line is closed by said relay, a plurality of switches in said control circuit in circuit with said relay whereby any of said switches may be closed in said circuit, each of said switches being in a line with a respective plunger in said sensing head, said control circuit being open at said plungers, a contact on said machine in front of said slip and in said control circuit closable by the movement of said control sensing plungers, there being coded holes on the slip determining which if any plungers pass through to make contact with said contact, whereby said relay is energized to close said line when said coded information causes the plungers to close in proper order with said selected switches.

9. In an electrical sensing apparatus for bookkeeping machines in which a record slip such as a bank check is inserted to have information printed thereon and wherein said slip is brought into position in alignment in said machine, and wherein said slip has been pre-indicated and coded with certain identifying information to be verified and sensed on said machine, an electrical sensing head having a plurality of electrical sensing elements, electrical means on said head normally actuated by any of said elements in normal sensed position, a main line current for said main bookkeeping machine controlled by said sensing device and having a control line, one side of said control line connected to said electrical means, the other side of said control line having the coil of a sensing relay therein, the contacts of said relay being open in said main line until closed by said coil energization, a plurality of sensing index switches in said sensing control circuit, each of said switches being manually operated to index sensing data therewith, each of said index switches being connected with a respective sensing element whereby said sensing element corresponds with a particular manual index switch said control relay normally being open thereby denying power to said machine unless the slip code corresponds with the data entered on said sensing switches.

10. In an electrical sensing device for attachment on a conventional bookkeeping machine which normally is power operated by a line current and which device controls the power line to the machine to prevent operation thereof unless a correct comparison is accomplished by the sensing device on a slip having pre-coded information thereon, a retaining means on said machine into which said slip may be inserted in alignment and removed therefrom, a sensing means adjacent and cooperating with said retaining means to sense information on the slip inserted therein when brought into sensing position therewith, said sensing means having electrical sensing elements for sensing the surface of the slip positioned, a control circuit for said power line, a control relay in said control circuit and said main line normally maintaining said line open whereby power will not be available to said bookkeeping machine unless said line is closed by said relay, a plurality of switches in said control circuit in circuit with said relay whereby any of said switches may be closed in said circuit, each of said switches being in a line with a respective element in said sensing head, said control circuit being open at said sensing means in said control circuit closable by the movement of said control sensing means, there being coded affected places on the slip determining which if any elements sense said code, whereby the relay is energized to close said line when said coded information causes the circuit to close in proper order with said selected switches.

11. In a sensing device for verifying bank checks and the like on a conventional office machine that normally performs a bookkeeping or similar operation on the check and wherein said check has been provided with a coded index matching the proper identification, electric power line means for said office machine, a control circuit for said power means normally maintaining said power means in open condition when said sensing device is in operation whereby power is denied to said machine unless verification takes place, a sensing means in said control circuit normally opening said control circuit, and being operable by sensing said check to close a circuit, an electrically operated circuit closing means in said control circuit having an electric portion thereof operable in said power line means to close said line in response to operation of said control circuit, a plurality of different electrical sensing elements actuatable on said sensing means to inspect electrically and sense indication provided on said check, electric responsive indicia coded on said check to affect said electric sensing means to provide an electrically conductive path thereat when said sensing index corresponds with a sensed position on said check, and a plurality of switches on said sensing device for electrically entering a code therein which provides electric conductive paths in said control circuit between said switches and a respective sensing element in said sensing means, said control circuit being closed upon proper verification when said sensing elements sense the same code on said check as entered by said switches electrically, whereby said control circuit will close said main line when sensing index is complete and will continue to deny current through said main line when sensing is not accomplished through the location of the same code as indexed into said device.

12. In a sensing device for electrically verifying a bank check and the like placed in a conventional bookkeeping machine and the like that normally performs bookkeeping or other operations on said check and wherein the check has been pre-coded before distribution and said code is maintained on file to be indexed into said machine when said check is processed, an electric current power line for operating said machine, a check positioning means on said machine in which said check can be positioned for alignment thereon, a sensing means on said machine located at said check position for sensing said check when positioned therein, a plurality of sensing elements electrically operable on said check, a line closing switch operable by said sensing means to close said power line to provide power to said machine and normally being open until said sensing has been effected, one side of said line at said sensing means being a common contact for all of said sensing elements, said sensing elements being indexed in a code arrangement corresponding to the code selected for the check, a plurality of normally open, manually operated switches on said sensing device in circuit with said other side of said sensing elements from said common contact and being operable selectively to enter a code therein, each of said switches having a corresponding position at a respective sensing element and both being coded with the same code as said check, electrical conductive means on said check in said coded positions, said sensing elements being operable with said conductive means to complete a circuit therewith wherever an element finds a corresponding indication on the check, said sensing means being operated to sense said check and to close said main line when the index in said index entered in said manually operated switches corresponds at said sensing elements with the coded information on said check, whereby said check is verified at said sensing means and said machine will not operate unless said check corresponds with said coded index.

13. In a sensing device for electrically verifying a bank check and the like placed in a conventional bookkeeping machine and the like that normally performs bookkeeping or other operations on said check and wherein the check has been pre-coded before distribution and said code is maintained on file to be indexed into said machine when said check is processed, an electric current power line for operating said machine, a control circuit of reduced current, a check positioning means on said machine in which said check can be positioned for alignment thereon, an electrical sensing means on said machine in circuit with said control circuit and being located at said check position for sensing said check when positioned therein, a plurality of sensing elements electrically operable on said check, a line closing switch in said line operable by said sensing means to close said power line to provide power to said machine and normally being open until said sensing has been effected, a control circuit having a relay coil therein for actuating said switch, one side of said control circuit at said sensing means being a common contact for all of said sensing elements, said sensing elements being indexed in a code arrangement corresponding to the code selected for the check, a plurality of normally open, manually operated switches on said sensing device in circuit in said control circuit with said other side of said sensing elements from said common contact and being operable selectively to enter a code therein, each of said switches having a corresponding position at a respective sensing element and both being coded with the same code as said check, electrical conductive means on said check in said coded positions, said sensing elements being operable with said conductive means to complete a circuit therewith wherever an element finds a corresponding indication on the check, said sensing means being operated to sense said check and to energize said relay to close said main line when the index in said index entered in said manually operated switches corresponds at said sensing elements with the coded information on said check, whereby said check is verified at said sensing means and said machine will not operate unless said check corresponds with said coded index.

14. In a sensing device for verifying bank checks and the like for use with a conventional office machine that normally performs a bookkeeping or similar operation on the check and wherein said check has been provided with a coded index matching the proper identification, electric power line means for said office machine, a control circuit for said power means normally maintaining said power means in open condition when said sensing device is in operation whereby power is denied to said machine unless verification takes place, a sensing means in said control circuit normally opening said control circuit and being operable by sensing said check to close a circuit, an electrically operated circuit closing means in said control circuit having an electric portion thereof operable in said power line means to close said line in response to operation of said control circuit, a plurality of different electrical sensing means actuatable with said sensing means to inspect and sense indication provided on said check, electric responsive indicia coded on said check to affect said electric sensing means to provide an electrically conductive path thereat when said sensing index corresponds with a sensed position on said check, and means on said sensing device for electrically entering a code therein which provides electric conductive paths in said control circuit between said means and a respective sensing position in said sensing means, said control circuit being closed upon proper verification when said sensing means senses the same code on said check as entered into said sensing means electrically, whereby said control circuit will close said main line when sensing is complete and will continue to deny current through said main line when sensing is not accomplished through the location of the same code as indexed into said device.

15. In a slip sensing device for attachment on a bookkeeping machine which normally prints bookkeeping information on the slip and wherein the slip has certain pre-recorded sensing comparison data entered thereon, a slip positioning bar movably mounted on said machine adjacent said printing area to hold and position a slip inserted therein to receive bookkeeping information entered thereon, an alignment means on said bar to align a slip on said bar and position it properly in position with said sensing opening, a sensing device on the said machine and having a sensing case with a plurality of sensing elements projecting therefrom, each of said elements representing an item of pre-recorded data and said slip having the pre-recorded comparison data thereon to be sensed by each of said sensing elements when aligned therewith, an electrical contact means on said machine adjacent said slip alignment means to be positioned in sensing position with said slip, said contact means being contactible by any of said sensing elements that find a corresponding data position on said slip, said slip being positionable on said machine from a slip inserting non-sensing position to a different sensing position where said sensing elements are brought into sensing position with said slip and in alignment with the data information thereon, a sensing indexing device on said machine having a manual switch index thereon on which there are a plurality of sensing data entering elements that are operated by hand to enter the basic data, electric power means for said bookkeeping machine controlled by said sensing index device, a plurality of electrical switches actuatable by said indexing keys to enter the basic information by closing certain of said switches, each of said switches being in an electrical connection with and having a corresponding sensing element whereby actuation of said key closes a switch to said sensing element, a control relay in each group of sensing elements closable when said sensing elements find a corresponding data position on said slip, the line of said electric power means being controlled electrically by said control relays whereby said line is open unless all of said sensing relays are closed.

16. In an electrical sensing and comparing apparatus for attachment to an electrically powered office machine or the like to determine if a slip inserted therein matches with an indexed code entered into the sensing device, a main electric power line for operation of the main office machine, a control circuit for said power line operated by current thereto, a sensing means in said control circuit having means thereon for electrically sensing indicia on the slips, said sensing means being operated by the location of said indicia to make a conductive path, one side of said control circuit extending from said sensing means and being normally open thereacross, the other side of said control circuit extending through the coil of a control relay, the contacts of said relay being in said main line and normally being open immediately preceding sensing whereby said main line power is denied said office machine, a sensing index code switch means in series with said same side of said control line as said relay coil and comprising a plurality of manually operated and indexed switches in parallel in said line, each of said switches being electrically connected with the sensing means and said element being identified with said switch index, the slip to be identified also being provided with a code index corresponding with said index switches and consisting of electrical conductive means on the check by which said elements sense the presense of same, said sensing means being adjacent said slip when said slip is in place whereby said sensing means senses for the conductive indicia and makes contact with said contact wherever an indication is found by virtue of which contact is made only where there is an indexed position on said slip, the initial closing of an index switch closing the connection from that switch to the sensing means which is initially open at said slip with the other side of the control circuit, the location by the sensing means of a position on said slip corresponding with the particular index switch indexed resulting electrically in the energization of said control relay to actuate the relay contact into closed position in said main line whereby said line current may be applied to the main office machine.

17. In an electrical sensing and comparing apparatus for attachment to an electrically powered office machine or the like to determine if a slip inserted therein matches with an indexed code entered into the sensing device, a main electric power line for operation of the main office machine, a control circuit for said power line controlling the closing of same, a sensing means on said main office machine having a plurality of electrical sensing positions thereon by which electrical conduction may be effected, one side of said control circuit extending to said sensing means being normally open thereat to be closed at any of said sensing positions, a control relay, the other side of said control circuit extending through the coil of said relay, the contacts of said relay being in said main line and normally being open immediately preceding sensing whereby said main line power is denied said office machine, a sensing index code switch means in series with said same side of said control line as said relay coil and comprising a plurality of manually operated and indexed circuit closers in parallel in said line, each of said circuit closers being electrically connected with a respective sensing position in said sensing means and said position being identified with said index, the slip to be identified also being provided with a code index correspondingly with said index closers and said positions and consisting of electrical responsive means on the check which cause said positions to sense the presence of same, said sensing positions being adjacent to a corresponding index spot when said slip is in place whereby said sensing elements sense for the spot and make contact with said contact wherever it is found, by virtue of which contact is made only where there is an indexed position on said slip, the initial closing of an index switch closing the connecton from that swtch to the corresponding sensing element which is initially open at said slip with the other side of the control circuit, the location by the sensing elements of a position on said slip corresponding with the particular index switch indexed resulting electrically in the energization of said control relay to actuate the relay contact into closed position in said main line whereby said line current may be applied to the main office machine.

18. In an electrical sensing and comparing apparatus for attachment to an electrically powered office machine or the like to determine if a slip inserted therein matches with an indexed code entered into the sensing device, a main electric power line for operation of the main office machine, a control circuit for said power line operated by a reduced current, a transformer in said main line providing the reduced current for said control circuit, a plurality of electrical sensing elements mounted on said machine and each operable to make and break electrical connection between opposite sides of said control circuit, one side of said control circuit extending from said sensing device and being connected to one side of said normally open sensing elements and being closed by said elements upon actuation, at least one control relay in said control circuit, the other side of said control circuit extending through the coil of said relay, the contacts of said relay being in said main line and normally being open immediately preceding sensing whereby said main line power is denied said office machine, a sensing index code switch means in series with said same side of said control line as said relay coil and comprising a plurality of manually operated and indexed switches in parallel in said line, each of said switches being electrically connected with a respective sensing element in said sensing means and said element being identified with said switch index, the slip to be identified also being provided with a code index corresponding with said index switches and consisting of indicia on the check from which said elements electrically sense the presene of same, said elements being adjacent said slip code indicia when said slip is in place whereby said sensing elements sense for the code and are electrically actuated wherever an indication is found by virtue of which contact is made only where there is an indexed position on said slip, the initial closing of an index switch closing the connection from that switch to the corresponding sensing element which is initially open at said slip with the other side of the control circuit, the location by the sensing elements of a position on said slip corresponding with the particular index switch indexed resulting electrically in the energization of said control relay to actuate the relay contact into closed position in said main line whereby said line current may be applied to the main office machine.

19. In a slip sensing device for attachment on a bookkeeping machine which normally prints bookkeeping information on the slip and wherein the slip has certain pre-recorded sensing comparison data entered thereon, a slip positioning bar movably mounted on said machine adjacent said printing area to hold and position a slip inserted therein to receive bookkeeping information entered thereon, said bar having an elongated space formed thereon open front to back thereof and normally behind an area of said slip positioned therein corresponding with pre-recorded sensing information entered on said slip, an alignment bracket on said bar having an alignment edge engageable with the edge of the slip to align same within said bar and properly in front of said sensing opening, a sensing device on the back of said machine behind said opening and having a sensing case with a plurality of sensing elements projecting therefrom and being resiliently mounted therein, each of said elements representing an item of pre-recorded data and said slip having the prerecorded comparison data thereon to be sensed by each of said sensing elements through said opening, an electrical contact bar on the front of said machine in front of said slip and in front of said opening, said contact bar being contactible by any of said sensing elements that finds a corresponding data position on said slip, said bar being movable on said machine from a slip inserting non-sensing position to a different sensing position where said sensing elements are brought into sensing position with said slip and in alignment with the data information thereon, a sensing indexing device on said machine having a keyboard thereon on which there are a plurality of sensing data entering elements that are operated by hand to enter the basic data, electric power means for said bookkeeping machine controlled by said sensing index device, a plurality of electrical switches actuatable by said indexing keys to enter the basic information by closing certain of said switches, each of said switches being in a line with and having a corresponding sensing element whereby actuation of said key closes a switch to said sensing element, a relay in each group of sensing elements closable when said sensing elements find a corresponding data position on said slip, one side of the line of said electric power means being controlled electrically by said relays whereby said line is open unless all of said sensing relays are closed by virtue of which said slip is examined electrically to determine if it corresponds with the basic data entered in said sensing device.

20. In an electrical sensing and comparing apparatus for attachment to an electrically powered office machine or the like to determine if a slip inserted therein matches with an indexed code entered into the sensing device, a main electric power line for operation of the main office machine, a control circuit for said power line operated by a reduced current, a transformer in said main line providing the reduced current for said control circuit, a sensing device on said main office machine having a plurality of electrical connections thereon to which electrical lines may be connected, an insulated case having terminals thereon to which said connections lead, a plurality of electrical sensing plunger elements mounted in said case and each operable to make and break electrical connection with a respective case terminal, one side of said control circuit extending to said sensing device and being connected to an elongated contact bar normally open from said sensing elements but being contacted by said elements upon actuation, said same side of said line also connecting to a temporary initial power contact bar on said case initially in electrical connection with at least some of said sensing elements to temporarily and initially maintain said main line closed, at least one control relay in said control circuit, the other side of said control circuit extending through the coil of said relay, the contacts of said relay being in said main line and normally being open immediately preceding sensing whereby said main line power is denied said office machine, a sensing index code switch means in series with said same side of said control line as said relay coil and comprising a plurality of manually operated and indexed switches in parallel in said line, each of said switches being electrically connected with a respective sensing element in said sensing case and said element being identified with said switch index, the slip to be identified also being provided with a code index corresponding with said index switches and consisting of holes punched in the check in which said elements sense the presence of same, said slip insulating said plungers from contact with said contact bar where there are no holes in said check, said contact being adjacent said slip holes when said slip is in place whereby said sensing elements sense for the opening and make contact with said contact wherever an opening is found by virtue of which contact is made only where there is an indexed position on said slip, the initial closing of an index switch closing the connection from that switch to the corresponding sensing element which is initially open at said slip with the other side of the control circuit, the location by the sensing elements of a position on said slip corresponding with the particular selected index switches indexed resulting electrically in the energization of said control relay to actuate the relay contact into closed position in said main line whereby said line current may be applied to the main office machine.

21. The device in claim 20 wherein there is a normally open re-set switch in said line and also on "off-on" switch in said line to cut said sensing device out when desired to permit said machine to operate independently thereof.

References Cited in the file of this patent

UNITED STATES PATENTS

| | | |
|---|---|---|
| 1,497,893 | Daubmeyer | June 17, 1924 |
| 1,991,729 | Brougham | Feb. 19, 1935 |
| 2,502,785 | Gottschalk | Apr. 4, 1950 |
| 2,634,911 | Wolowitz | Apr. 14, 1953 |
| 2,712,898 | Knutsen | Sept. 12, 1955 |
| 2,761,623 | Lambert et al. | Sept. 4, 1956 |